(12) United States Patent
Zembillas

(10) Patent No.: US 6,962,322 B1
(45) Date of Patent: *Nov. 8, 2005

(54) WASTE WATER VALVE SYSTEM

(76) Inventor: Mike Nick Zembillas, 601 N. Florida Ave., Tarpon Springs, FL (US) 34689

( * ) Notice: Subject to any disclaimer, the term of this patent is extended or adjusted under 35 U.S.C. 154(b) by 0 days.

This patent is subject to a terminal disclaimer.

(21) Appl. No.: 10/802,181

(22) Filed: Mar. 17, 2004

Related U.S. Application Data

(63) Continuation-in-part of application No. 10/701,811, filed on Nov. 5, 2003.

(51) Int. Cl.$^7$ .............................................. F16K 31/44
(52) U.S. Cl. ...................... 251/231; 251/279; 251/251; 251/319; 137/899
(58) Field of Search ............................... 251/231, 279, 251/319, 326; 137/899

(56) References Cited

U.S. PATENT DOCUMENTS

| | | | | |
|---|---|---|---|---|
| 909,921 A | * | 1/1909 | Markman | 137/599.18 |
| 4,026,517 A | * | 5/1977 | Still | 251/214 |
| 4,483,509 A | * | 11/1984 | Lewcock et al. | 251/86 |
| 5,439,198 A | * | 8/1995 | Reed | 251/231 |

* cited by examiner

Primary Examiner—Edward K. Look
Assistant Examiner—John K. Fristoe, Jr.
(74) Attorney, Agent, or Firm—Edward P. Dutkiewicz

(57) ABSTRACT

A drain pipe dispenses waste water from the vehicle. The drain pipe has a circumferential slot and a gate collar around the drain pipe over the slot. A gate valve is coupled to the gate collar. A gate reciprocable between a closed and open position is provided. A drive rod coupled to the gate with a free end is formed with a C-shaped hook. A pivot bolt is provided. The lever is rotatably supported on the pivot bolt. A handle has an intermediate extent. The intermediate extent is slidably received in the C-shaped hook whereby moving the handle toward the drain pipe closes the gate valve and moving the handle away from the drain pipe opens the gate valve.

9 Claims, 5 Drawing Sheets

FIG 7
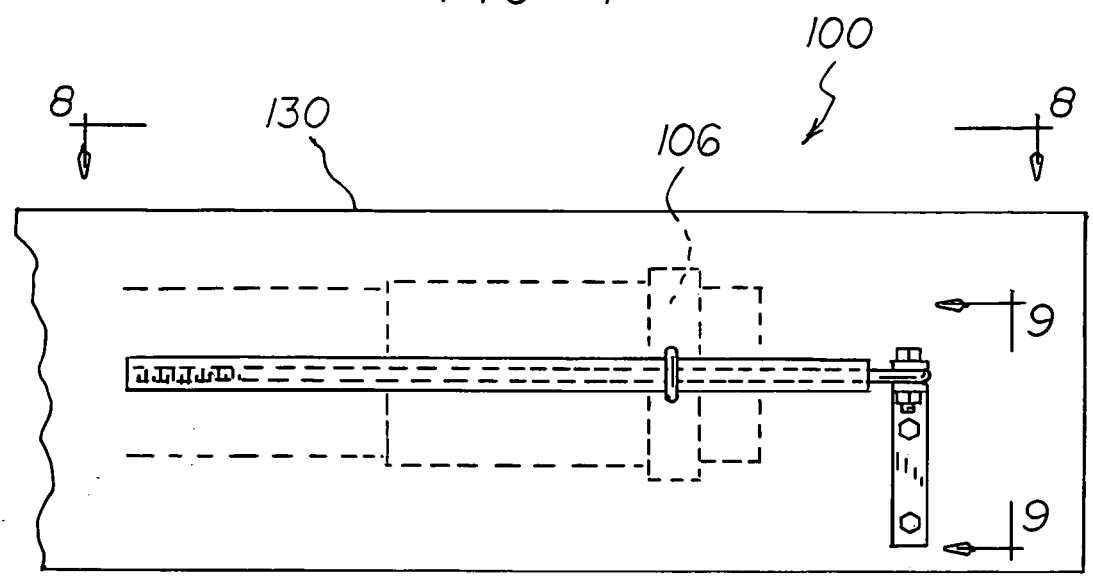
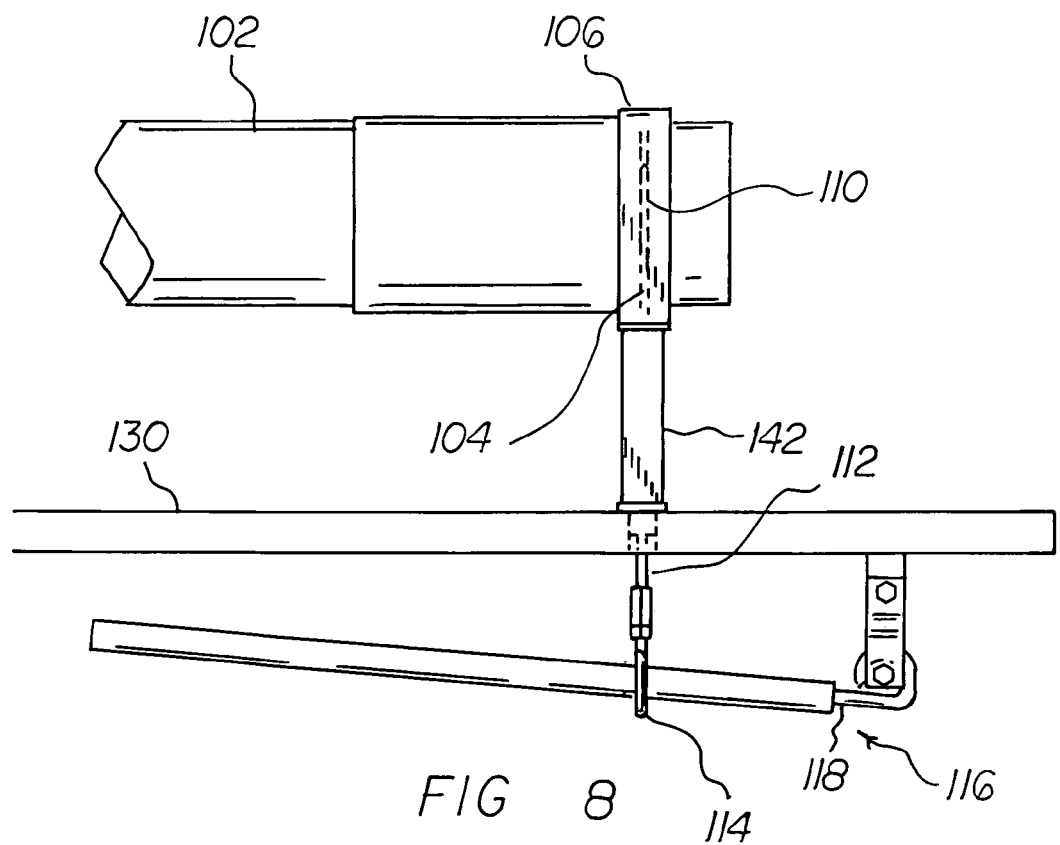
FIG 8

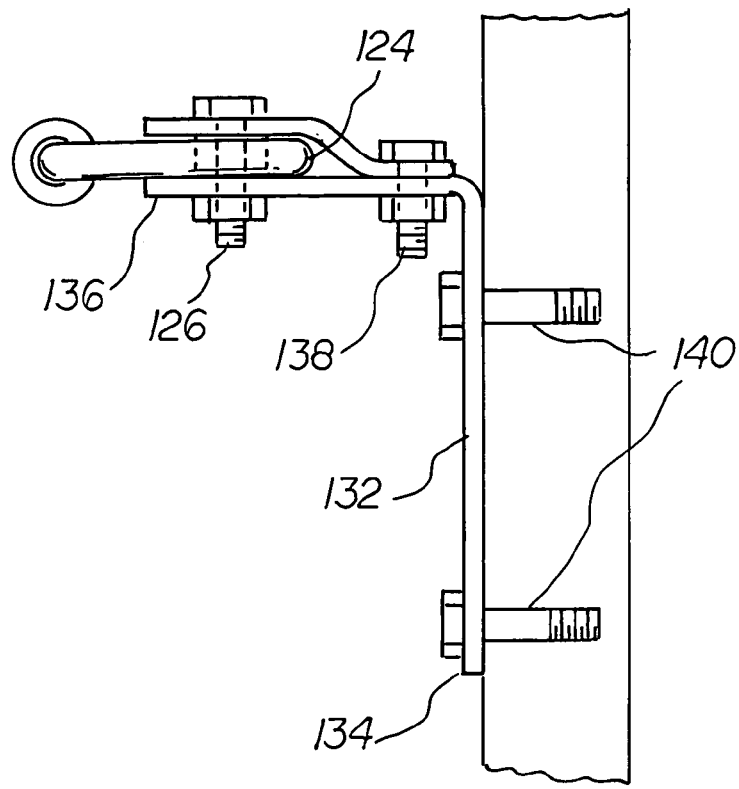
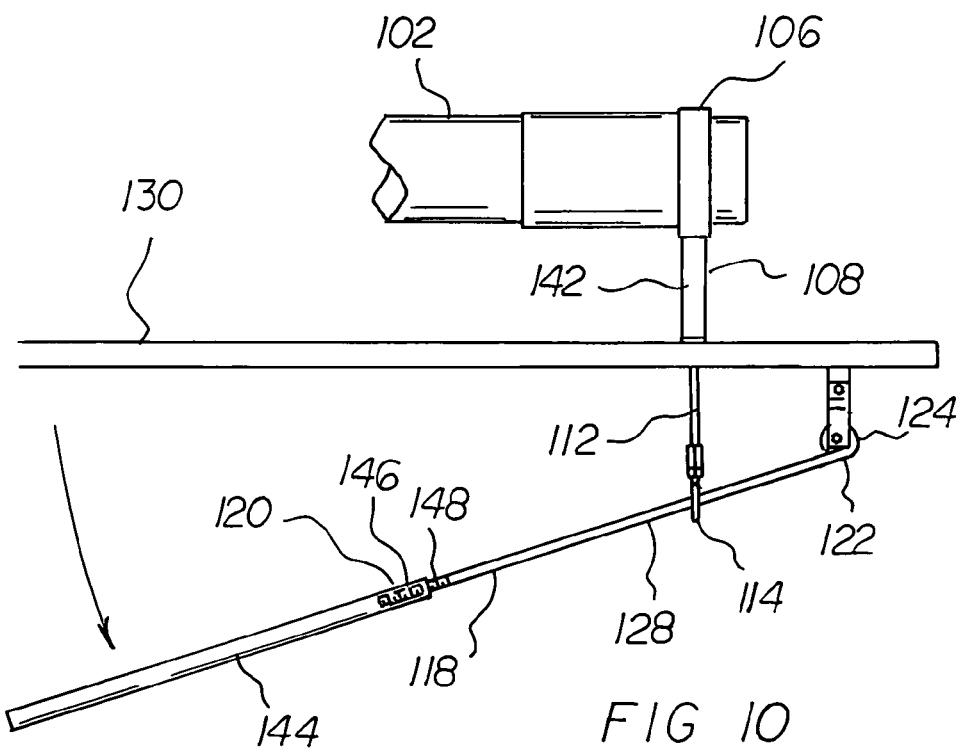

US 6,962,322 B1

WASTE WATER VALVE SYSTEM

RELATED APPLICATION

The present patent application is a continuation-in-part of U.S. patent application Ser. No. 10/701,811 filed Nov. 5, 2003 and now pending.

BACKGROUND OF THE INVENTION

1. Field of the Invention

The present invention relates to a waste water valve system and more particularly pertains to for facilitating the opening and closing of a gate valve in a safe, efficient, and convenient manner.

2. Description of the Prior Art

The use of waste water systems of known designs and configurations is known in the prior art. More specifically, waste water systems of known designs and configurations previously devised and utilized for the purpose of handling waste water through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,871,399 Issued Mar. 18, 1975 to Watson relates to a holding tank for campers. U.S. Pat. No. 3,811,462 Issued May 21, 1974 to Feliz relates to a recreational vehicle utility stowage and transfer system. U.S. Pat. No. 3,575,348 Issued Apr. 20, 1971 to MacKay relates to a device for washing and rinsing. U.S. Pat. No. 3,571,822 Issued Mar. 23, 1971 to Shaw relates to a toilet facility ventilation system. Lastly, U.S. Pat. No. 3,040,333 Issued Jun. 26, 1962 to Merrill relates to a waste material holding tank.

While these devices fulfill their respective, particular objectives and requirements, the aforementioned patents do not describe waste water valve system that allows for facilitating the opening and closing of a gate valve in a safe, efficient, and convenient manner.

In this respect, the waste water valve system according to the present invention substantially departs from the conventional concepts and designs of the prior art, and in doing so provides an apparatus primarily developed for the purpose of for facilitating the opening and closing of a gate valve in a safe, efficient, and convenient manner.

Therefore, it can be appreciated that there exists a continuing need for a new and improved waste water valve system which can be used for facilitating the opening and closing of a gate valve in a safe and efficient and convenient manner. In this regard, the present invention, as evidenced by the disclosed preferred and alternate embodiments, substantially fulfills this need.

SUMMARY OF THE INVENTION

In view of the foregoing disadvantages inherent in the known types of waste water systems of known designs and configurations now present in the prior art, the present invention provides an improved waste water valve system. As such, the general purpose of the present invention, which will be described subsequently in greater detail, is to provide a new and improved waste water valve system and method which has all the advantages of the prior art and none of the disadvantages.

To attain this, the present invention essentially comprises a vehicle. The vehicle is of the type which has water handling capabilities. The vehicle type includes recreational vehicles, trailers, and mobile homes. The vehicle has a front end and a rear end. A direction of movement is provided between the front end and the rear end. The vehicle has rear wheels. The rear wheels are rotatable about an axis of rotation spaced forwardly of the rear end. A base is provided.

A drain pipe is provided. The drain pipe has an input end. The input end is coupled to the vehicle. The drain pipe has an output end. A passageway is provided through the drain pipe. The drain pipe is adapted to dispense waste water from the vehicle. The drain pipe is located between the rear wheels and the rear end. The drain pipe is in a cylindrical configuration. The drain pipe has a central axis. The central axis is provided parallel with the axis of rotation. A 180 degree circumferential slot is provided in the drain pipe. The slot faces the rear wheels at a short first distance from the output end of the drain pipe. A gate collar is provided. The gate collar is around the drain pipe over the slot. A lever collar is provided. The lever collar is provided around the drain pipe a second distance from the output end. The second distance is greater than the first distance.

Provided next is a gate valve. The gate valve is coupled to the gate collar. A gate is provided. The gate is reciprocable between a closed position and an open position. In the closed position, the gate extends across the passageway to preclude the flow of waste water through the gate. In the an open position the gate is out of the passageway to allow the flow of waste water through the gate. Note FIG. 6 with the gate midway between the open and closed positions. The gate has a leading edge. The leading edge is in a crescent-shaped configuration. Note FIG. 2. The gate also has a trailing edge. The trailing edge has an aperture. The gate valve also includes a drive rod. The drive rod has a clevis. The clevis is coupled to the trailing edge of the gate. The gate valve has a free end. The free end is formed with a C-shaped hook and with a turnbuckle for adjustment purposes. The gate valve further includes a gate shield. The gate shield has a first end. The first end is coupled to the gate collar. The gate shield has a second end. The second end has an aperture. The aperture provides for the sliding passage of the drive rod. The gate valve also includes a pair of elastomeric rings. The rings are formed of an elastomer. The elastomer is selected from the class of elastomers which includes plastic and rubber, natural and synthetic, and blends thereof. The rings are located within the drain pipe adjacent to the slot. The gate is movable between the rings for seal-forming purposes.

Provided last is a lever assembly. The lever assembly includes an extension member. The extension member has a first end. The first end is integrally formed with the lever collar. The extension member has a second end. The second end has an aperture. The second end further has a nut with an associated bolt. The associated bolt is provided through the aperture. The lever assembly also has a lever. The lever has a loop at one end constituting a pivot point which is rotatably supported on the bolt between the apertures of the extension members. A handle is provided at the other end. An intermediate extent is provided between. The intermediate extent is slidably received in the C-shaped hook of the drive rod. In this manner the hook grasps the handle and moves it toward the drain pipe. The gate valve will close and move it away from the drain pipe. The gate valve will open. The positioning of the pivot point and the handle at opposite ends of the lever with the gate valve constituting a load there between will create a second class lever for maximum efficiency and convenience and safety.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved waste water valve system which has all of the advantages of the prior art waste water systems of known designs and configurations and none of the disadvantages.

It is another object of the present invention to provide a new and improved waste water valve system which may be easily and efficiently manufactured and marketed.

It is further object of the present invention to provide a new and improved waste water valve system which is of durable and reliable constructions.

An even further object of the present invention is to provide a new and improved waste water valve system which is susceptible of a low cost of manufacture with regard to both materials and labor, and which accordingly is then susceptible of low prices of sale to the consuming public, thereby making such waste water valve system economically available to the buying public.

Even still another object of the present invention is to provide a waste water valve system for facilitating the opening and closing of a gate valve in a safe, efficient, and convenient manner.

Lastly, it is an object of the present invention to provide a new and improved waste water valve system. A drain pipe dispenses waste water from the vehicle. The drain pipe has a circumferential slot and a gate collar around the drain pipe over the slot. A gate valve is coupled to the gate collar. A gate reciprocable between a closed and open position is provided. A drive rod coupled to the gate with a free end is formed with a C-shaped hook. A pivot bolt is provided. The lever is rotatably supported on the pivot bolt. A handle has an intermediate extent. The intermediate extent is slidably received in the C-shaped hook whereby moving the handle toward the drain pipe closes the gate valve and moving the handle away from the drain pipe opens the gate valve.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a front elevational view similar to FIG. 3 but illustrating an alternate embodiment of the invention.

FIG. 8 is a plan view of the gate valve and lever taken along line 8—8 of FIG. 7 with the gate valve in the closed position.

FIG. 9 is cross sectional view taken along line 9—9 of FIG. 7.

FIG. 10 is a plan view of the gate valve and lever similar to FIG. 8 but with the gate valve in the opened position.

The same reference numerals refer to the same parts throughout the various Figures.

DESCRIPTION OF THE PREFERRED EMBODIMENT

Figure 1:
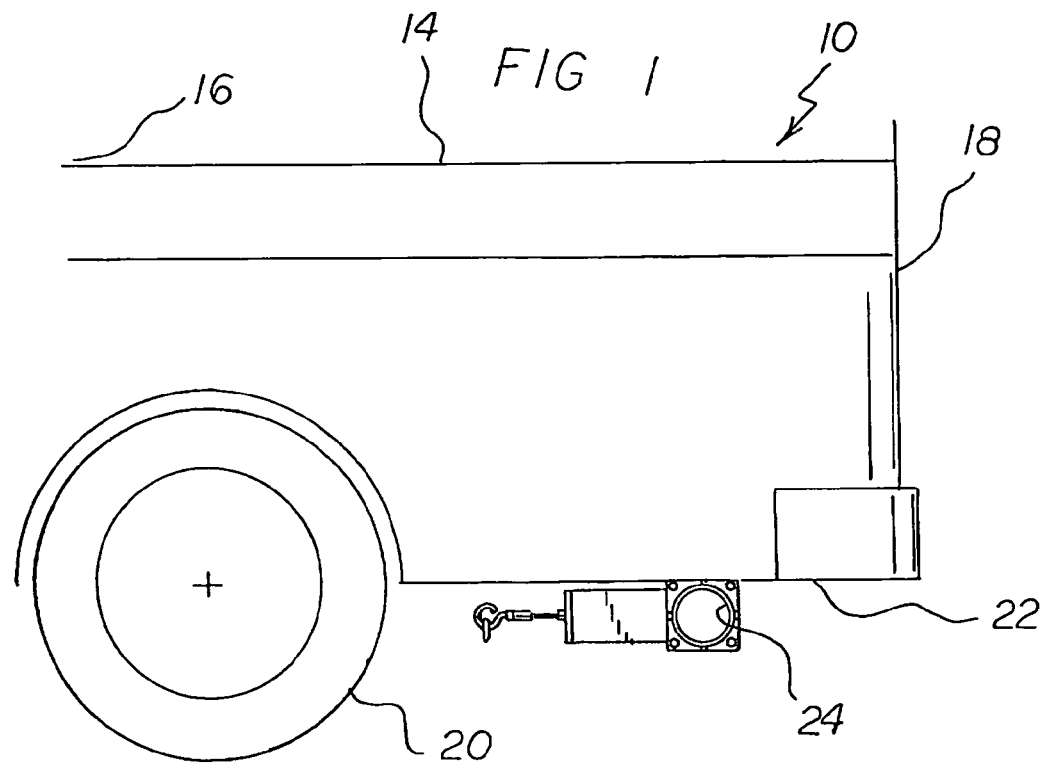
FIG. 1 is a side elevational view of the waste water valve system constructed in accordance with the principles of the present invention.

With reference now to the drawings, and in particular to FIG. 1 thereof, the preferred embodiment of the new and improved waste water valve system embodying the principles and concepts of the present invention and generally designated by the reference numeral 10 will be described.

The present invention, the waste water valve system 10 is comprised of a plurality of components. Such components in their broadest context include a drain pipe, a gate valve, and a lever assembly. Such components are individually configured and correlated with respect to each other so as to attain the desired objective.

First provided is a vehicle 14. The vehicle is of the type which has water handling capabilities. The vehicle type includes recreational vehicles, trailers, and mobile homes. The vehicle has a front end 16 and a rear end 18. A direction of movement is provided between the front end and the rear end. The vehicle has rear wheels 20. The rear wheels are rotatable about an axis of rotation spaced forwardly of the rear end. A base 22 is provided.

A drain pipe 24 is provided. The drain pipe has an input end 26. The input end is coupled to the vehicle. The drain pipe has an output end 28. A passageway is provided through the drain pipe. The drain pipe is adapted to dispense waste water from the vehicle. The drain pipe is located between the rear wheels and the rear end. The drain pipe is in a cylindrical configuration. The drain pipe has a central axis. The central axis is provided parallel with the axis of rotation. A 180 degree circumferential slot 30 is provided in the drain pipe. The slot faces the rear wheels at a short first distance from the output end of the drain pipe. A gate collar 32 is provided. The gate collar is around the drain pipe over the slot. A lever collar 34 is provided. The lever collar is provided around the drain pipe a second distance from the output end. The second distance is greater than the first distance. The lever collar is a two piece component with securement bolts on opposite sides of the drain pipe with associated nuts for securement purposes.

Figure 2:
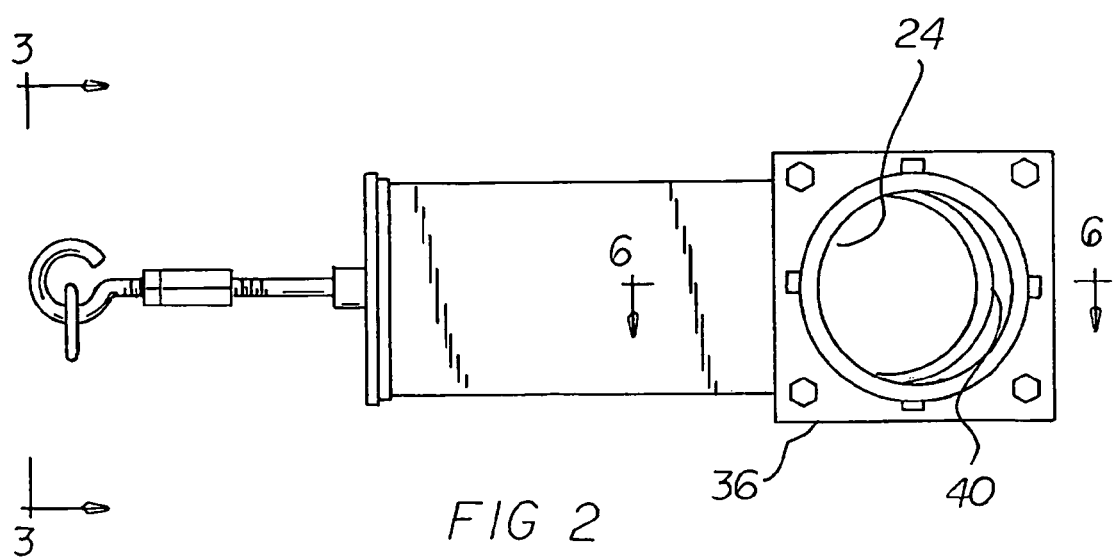
FIG. 2 is an enlarged side elevational view of the gate valve shown in FIG. 1.
Figure 3:
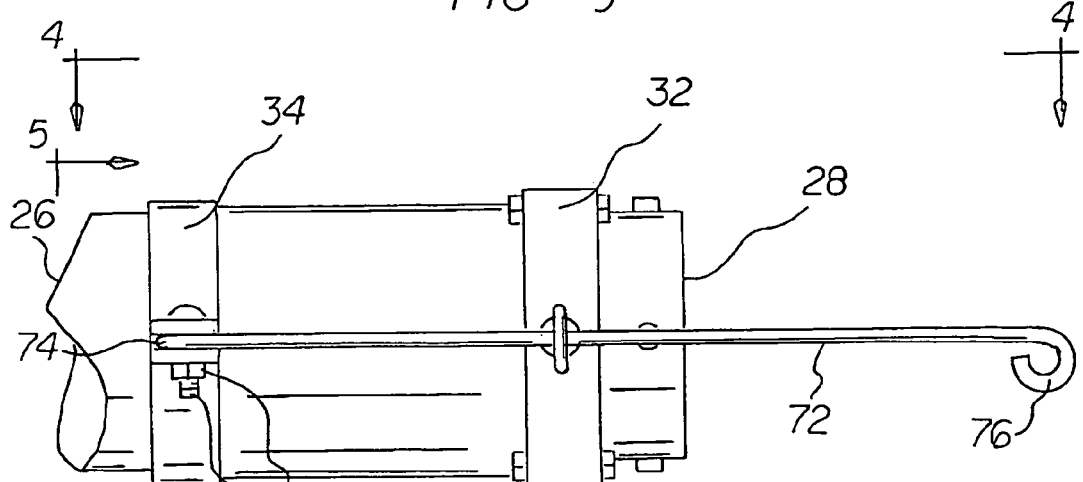
FIG. 3 is a front elevational view of the gate valve and lever taken along line 3—3 of FIG. 2.
Figure 4:
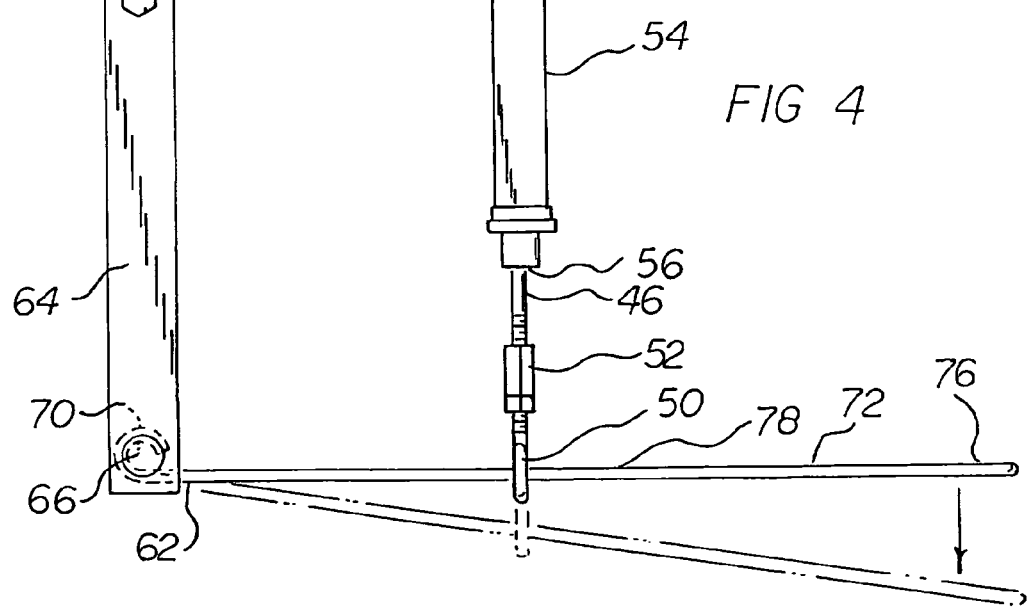
FIG. 4 is a plan view of the gate valve and lever taken along line 4—4 of FIG. 3.
Figure 5:
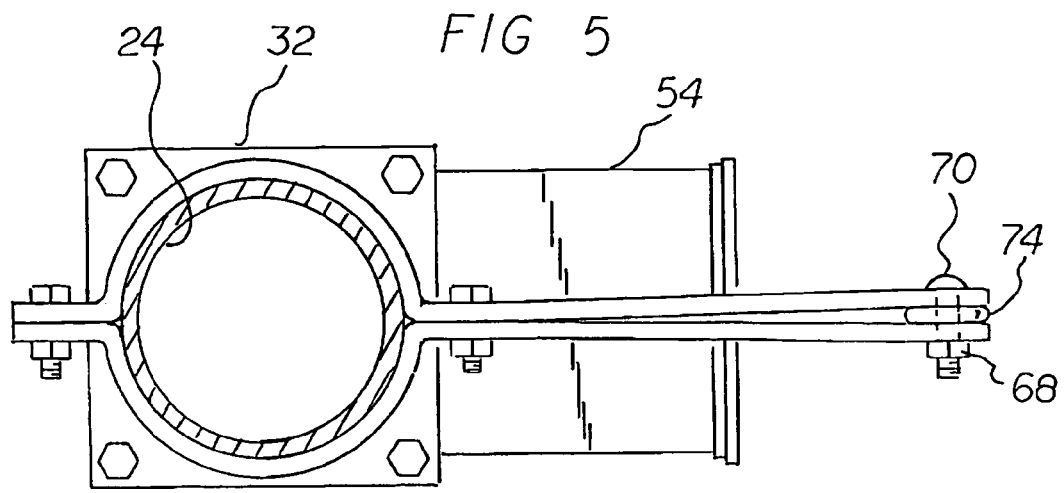
FIG. 5 is a cross sectional view of the gate valve taken along line 5—5 of FIG. 3.
Figure 6:
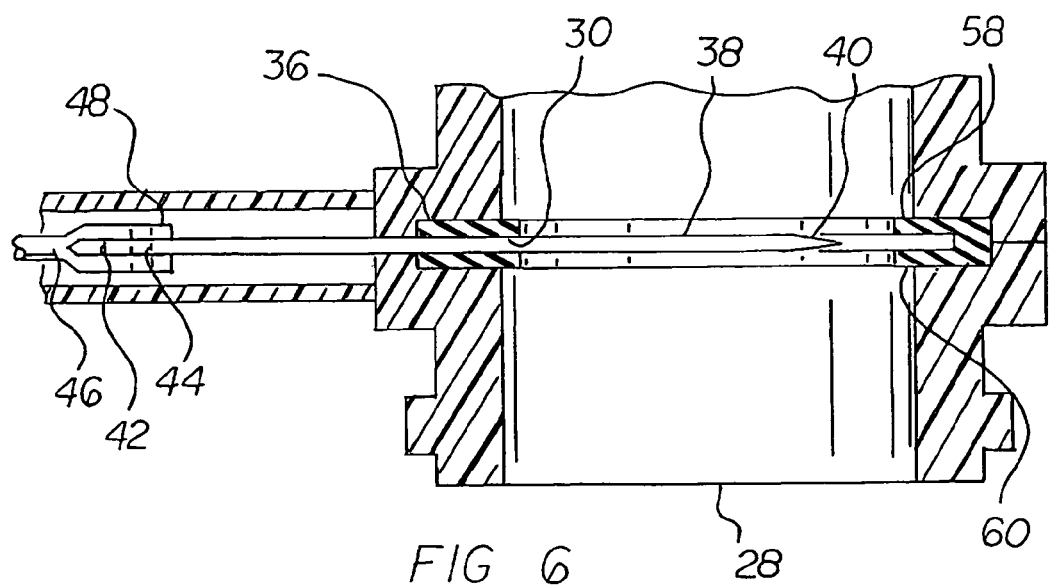
FIG. 6 is a cross sectional view of the gate valve taken along line 6—6 of FIG. 2.

Provided next is a gate valve 36. The gate valve is coupled to the gate collar. A gate 38 is provided. The gate is reciprocable between a closed position and an open position. In the closed position, the gate extends across the passageway to preclude the flow of waste water through the gate. In the an open position the gate is out of the passageway to allow the flow of waste water through the gate. Note FIG. 6 with the gate midway between the open and closed positions. The gate has a leading edge 40. The leading edge is in a crescent-shaped configuration. Note FIG. 2. The gate also has a trailing edge 42. The trailing edge has an aperture 44. The gate valve also includes a drive rod 46. The drive rod has a clevis 48. The clevis is coupled to the trailing edge of the gate. The gate valve has a free end. The free end is formed with a C-shaped hook 50 and with a turnbuckle 52 for adjustment purposes. The gate valve further includes a gate shield 54. The gate shield has a first end. The first end is coupled to the gate collar. The gate shield has a second end. The second end has an aperture 56. The aperture provides for the sliding passage of the drive rod. The gate valve also includes a pair of elastomeric rings 58, 60. The rings are formed of an elastomer. The elastomer is selected from the class of elastomers which includes plastic and rubber, natural and synthetic, and blends thereof. The rings are located within the drain pipe adjacent to the slot. The gate is movable between the rings for seal-forming purposes.

Provided last is a lever assembly 62. The lever assembly includes an extension member 64. The extension member has a first end. The first end is integrally formed with the lever collar. The extension member has a second end. The second end has an aperture 66. The second end further has a nut 68 with an associated bolt 70. The associated bolt is provided through the aperture. The lever assembly also has a lever 72. The lever has a loop 74 at one end constituting a pivot point which is rotatably supported on the bolt between the apertures of the extension member. A handle 76 is provided at the other end. An intermediate extent 78 is provided between. The intermediate extent is slidably received in the C-shaped hook of the drive rod. In this manner the hook grasps the handle and moves it toward the drain pipe. The gate valve will close and move it away from the drain pipe. The gate valve will open. The positioning of the pivot point and the handle at opposite ends of the lever with the gate valve constituting a load there between will create a second class lever for maximum efficiency and convenience and safety.

An alternate embodiment of the invention is illustrated in FIGS. 7 through 10. In such embodiment, the majority of the components are as in the embodiment of FIGS. 1 through 6. The major difference between the embodiments is in the lever and associated components.

More specifically, the system 100 of the alternate embodiment is a waste water valve system for facilitating the opening and closing of a gate valve in a safe, convenient and efficient manner. The system comprises, in combination, a drain pipe 102 adapted to dispense waste water from a vehicle. The drain pipe has a circumferential slot 104 and a gate collar 106 around the drain pipe over the slot.

Next provided is a gate valve 108 coupled to the gate collar. The gate valve includes a gate 110 reciprocable between a closed position to preclude the flow of waste water and an open position to allow the flow of waste water. The gate valve also includes a drive rod 112 coupled to the gate with a free end formed with a C-shaped hook 114.

A lever assembly 116 is next provided. The lever assembly includes a lever 118 has a first end 120. The lever also has a second end 122 formed into a loop 124 and with a pivot bolt 126 rotatably supporting the loop. The lever also has an intermediate extent 128 slidably received in the c-shaped hook. Due to this arrangement, moving the handle toward the drain pipe will close the gate valve while moving the handle away from the drain pipe will open the gate valve.

Provided next are a frame portion 130 on the vehicle laterally spaced from the drain pipe and parallel there with and a lever bracket 132. The lever bracket has an interior end 134 secured to the frame portion and an exterior end 136 supporting the pivot bolt. The exterior end of the lever bracket includes two parallel sections with the loop of the lever there between and a securement bolt 138 with an associated nut securing together the two parallel sections. The interior end of the lever bracket includes two attachment bolts 140 removably attaching the lever bracket to the frame portion. The axes of the attachment bolts perpendicular to the axis of the pivot bolt.

Lastly, a gate shield 142 is slidably receiving the gate. The gate shield is secured between the gate collar and the frame portion. The first end of the lever has male threads 148. For use there with, a hollow extender tube 144 is provided and is formed with female threads 146 at one end. As a result of this arrangement, the extender tube may be positioned over the majority of the extent of the lever and threadedly coupled thereto when the gate valve is closed. Note FIG. 8. In addition, the extender tube may be positioned over the minority of the extent of the lever and threadedly coupled thereto when the gate valve is opened. Note FIG. 10.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A waste water valve system for facilitating the opening and closing of a gate valve in a safe, convenient and efficient manner comprising, in combination:

a vehicle of the type which has water handling capabilities including recreational vehicles and trailers and mobile homes, the vehicle having a front end and a rear end and a direction of movement there between, the vehicle having rear wheels rotatable about an axis of rotation spaced forwardly of the rear end and with a base there between;

a drain pipe with an input end coupled to the vehicle and an output end and a passageway there through adapted to dispense waste water from the vehicle, the drain pipe being located between the rear wheels and the rear end and constructed of a cylindrical configuration with a central axis parallel with the axis of rotation, a 180 degree circumferential slot in the drain pipe facing the rear wheels at a short first distance from the output end of the drain pipe, and a gate collar around the drain pipe over the slot and a lever collar around the drain pipe a second distance from the output end, the second distance being greater than the first distance;

a gate valve coupled to the gate collar including a gate reciprocable between a closed position extending across the passageway to preclude the flow of waste water there through and an open position out of the passageway to allow the flow of waste water there through, the gate having a leading edge in a crescent-shaped configuration and a trailing edge with an aperture, the gate valve also including a drive rod with a clevis coupled to the trailing edge of the gate and free end formed with a C-shaped hook and with a turnbuckle there between for adjustment purposes, the gate valve also including a gate shield having a first end coupled to the gate collar and a second end with an aperture for the sliding passage of the drive rod, the gate valve also including a pair of elastomeric rings located within the drain pipe adjacent to the slot with the gate movable between the rings for seal-forming purposes; and a lever assembly including an extension member having a first end integrally formed with the lever collar and a second end with an aperture and a nut with an associated bolt through the aperture, the lever assembly also having a lever with a loop at one end constituting a pivot point which is rotatably supported on the bolt between the apertures of the extension member and a handle at the other end with an intermediate extent there between, the intermediate extent being slidably received in the C-shaped hook of the drive rod whereby grasping the handle and moving it toward the drain pipe will close the gate valve while moving it away from the drain pipe will open the gate valve and with the positioning of the pivot point and the handle at opposite ends of the lever with the gate valve constituting a load there between creates a second class lever for maximum efficiency and convenience and safety.

2. A waste water valve system for a vehicle of the type which has water handling capabilities comprising:

a drain pipe adapted to dispense waste water from a vehicle, the drain pipe having a circumferential slot and a gate collar around the drain pipe over the slot;

a gate valve coupled to the gate collar including a gate reciprocable between a closed position to preclude the flow of waste water and an open position to allow the flow of waste water, the gate valve also including a drive rod coupled to the gate with a free end formed with a C-shaped hook; and a lever assembly including a lever having a first end, the lever also having a second end formed into a loop and with a pivot bolt rotatably supporting the loop, the lever also having an intermediate extent slidably received in the c-shaped hook whereby moving a handle toward the drain pipe will close the gate valve while moving the handle away from the drain pipe will open the gate valve.

3. The system as set forth in claim 2 and further including:
a frame portion on the vehicle laterally spaced from the drain pipe and parallel there with.

4. The system as set forth in claim 2 and further including:
a lever bracket having an interior end secured to the frame portion and an exterior end supporting the pivot bolt.

5. The system as set forth in claim 4 wherein the exterior end of the lever bracket includes two parallel sections with the loop of the lever there between and a securement bolt with an associated nut securing together the two parallel sections.

6. The system as set forth in claim 5 wherein the interior end of the lever bracket includes two attachment bolts removably attaching the lever bracket to the frame portion with the axes of the attachment bolts perpendicular to the axis of the pivot bolt.

7. The system as set forth in claim 2 and further including:
a gate shield slidably receiving the gate, the gate shield being secured between the gate collar and the frame portion.

8. The system as set forth in claim 2 wherein the first end of the lever has male threads and further including a hollow extender tube with female threads at one end whereby the extender tube may be positioned over the majority of the extent of the lever and threadedly coupled thereto when the gate valve is closed and whereby the extender tube may be positioned over the minority of the extent of the lever and threadedly coupled thereto when the gate valve is opened.

9. A waste water valve system for a vehicle of the type which has water handling capabilities comprising:

a drain pipe adapted to dispense waste water from a vehicle, the drain pipe having a circumferential slot and a gate collar around the drain pipe over the slot;

a gate valve coupled to the gate collar including a gate reciprocable between a closed position to preclude the flow of waste water and an open position to allow the flow of waste water, the gate valve also including a drive rod coupled to the gate with a free end formed with a C-shaped hook; and a lever assembly including a lever having a first end, the lever also having a second end formed into a loop and with a pivot bolt rotatable supporting the loop, the lever also having an intermediate extent slidably received in the c-shaped hook whereby moving a handle toward the drain pipe will close the gate valve while moving the handle away from the drain pipe will open the gate valve; and a lever collar having an interior end attached to the drain pipe and an exterior end supporting the pivot bolt.

* * * * *